(12) United States Patent
Mays

(10) Patent No.: US 10,506,752 B1
(45) Date of Patent: Dec. 17, 2019

(54) TURF AERATOR FOOTWEAR KIT

(71) Applicant: Melvin Mays, Indianapolis, IN (US)

(72) Inventor: Melvin Mays, Indianapolis, IN (US)

(*) Notice: Subject to any disclaimer, the term of this patent is extended or adjusted under 35 U.S.C. 154(b) by 444 days.

(21) Appl. No.: 14/982,253

(22) Filed: Dec. 29, 2015

(51) Int. Cl.
| | | |
|---|---|---|
| A43C 15/00 | (2006.01) | |
| A43C 15/16 | (2006.01) | |
| A01B 1/24 | (2006.01) | |
| A43B 3/00 | (2006.01) | |
| A43C 15/02 | (2006.01) | |

(52) U.S. Cl.
CPC ............ *A01B 1/243* (2013.01); *A43B 3/00* (2013.01); *A43C 15/02* (2013.01); *A43C 15/161* (2013.01)

(58) Field of Classification Search
CPC ..... A43C 15/02; A43C 15/161; A43C 15/005; A01B 1/243
See application file for complete search history.

(56) References Cited

U.S. PATENT DOCUMENTS

| | | | | |
|---|---|---|---|---|
| 2,185,397 A | * | 1/1940 | Birchfield | A43C 15/162 36/59 R |
| 2,714,768 A | * | 8/1955 | Badler | A01B 1/00 36/1 |
| 3,219,378 A | * | 11/1965 | Padoshek | A01B 1/165 294/50.7 |
| 4,693,022 A | | 9/1987 | Terhune | |
| 5,152,348 A | | 10/1992 | Flanagan, Sr. et al. | |
| 5,555,943 A | | 9/1996 | Blasczyk | |
| 5,980,001 A | * | 11/1999 | Rubel | B62D 55/27 305/162 |
| 6,223,456 B1 | * | 5/2001 | Hawkins | A01B 1/243 172/22 |
| 8,806,779 B2 | * | 8/2014 | Auger | A43B 5/02 36/67 A |
| 9,032,645 B2 | * | 5/2015 | Stauffer | A43C 15/00 36/67 R |
| 2013/0048321 A1 | * | 2/2013 | Xin | A01B 1/243 172/22 |
| 2015/0189950 A1 | * | 7/2015 | Adams | A43B 5/00 36/59 R |

* cited by examiner

*Primary Examiner* — Jila M Mohandesi

(57) ABSTRACT

A turf aerator footwear kit including a footwear body, such as a boot, having an outsole disposed on an entire sole of the footwear body with threaded receptacles disposed in the outsole and a plurality of at least one of a first spike and a second spike, wherein each of the plurality of first spikes and the plurality second spikes is engageable to a respective one of the plurality of threaded receptacles. Each first spike and each second spike has a solid substantially frustoconical shaft and central shank, respectively, with a concave wall between a respective flat top end and flat bottom end and a flat upper end and flat lower end. A plurality of spiking tines coaxially extends from the central shank of each second spike. At least two of a pair of the spiking tines is disposed on diametrically opposite sides of the bottom edge.

7 Claims, 5 Drawing Sheets

TURF AERATOR FOOTWEAR KIT

BACKGROUND OF THE INVENTION

Various types of turf aerators in the form of machinery and footwear are known in the prior art to promote the appearance and health of lawns by facilitating the formation of holes in the turf to permit proper drainage and aeration. However, what is needed is a turf aerator footwear kit for the manual formation of hole in the turf of a lawn by wearing a footwear body, such as a boot, on each foot while walking on the turf.

FIELD OF THE INVENTION

The present invention relates to turf aerators, and more particularly, to a turf aerator footwear kit.

SUMMARY OF THE INVENTION

The general purpose of the present turf aerator footwear kit, described subsequently in greater detail, is to provide a turf aerator footwear kit which has many novel features that result in a turf aerator footwear kit which is not anticipated, rendered obvious, suggested, or even implied by prior art, either alone or in combination thereof.

To accomplish this, the present turf aerator footwear kit is provided to promote the appearance and health of lawns by facilitating the formation of holes in the turf to permit proper drainage and aeration. The present turf aerator footwear kit includes a footwear body, such as a boot, having an outsole disposed on an entire sole of the footwear body with threaded receptacles disposed in the outsole and a plurality of at least one of a first spike and a second spike, wherein each of the plurality of first spikes and the plurality second spikes is engageable to a respective one of the plurality of threaded receptacles. Each first spike and each second spike has a solid substantially frustoconical shaft and central shank, respectively, with a concave wall between a respective flat top end and flat bottom end and a flat upper end and flat lower end. A plurality of spiking tines coaxially extends from the central shank of each second spike. At least two of a pair of the spiking tines is on diametrically opposite sides of the bottom edge. In use, the footwear body to which one of the plurality of the first spikes and the plurality of the second spikes is attached is worn on each foot of a user while walking across the lawn to be aerated.

Thus has been broadly outlined the more important features of the present turf aerator footwear kit so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
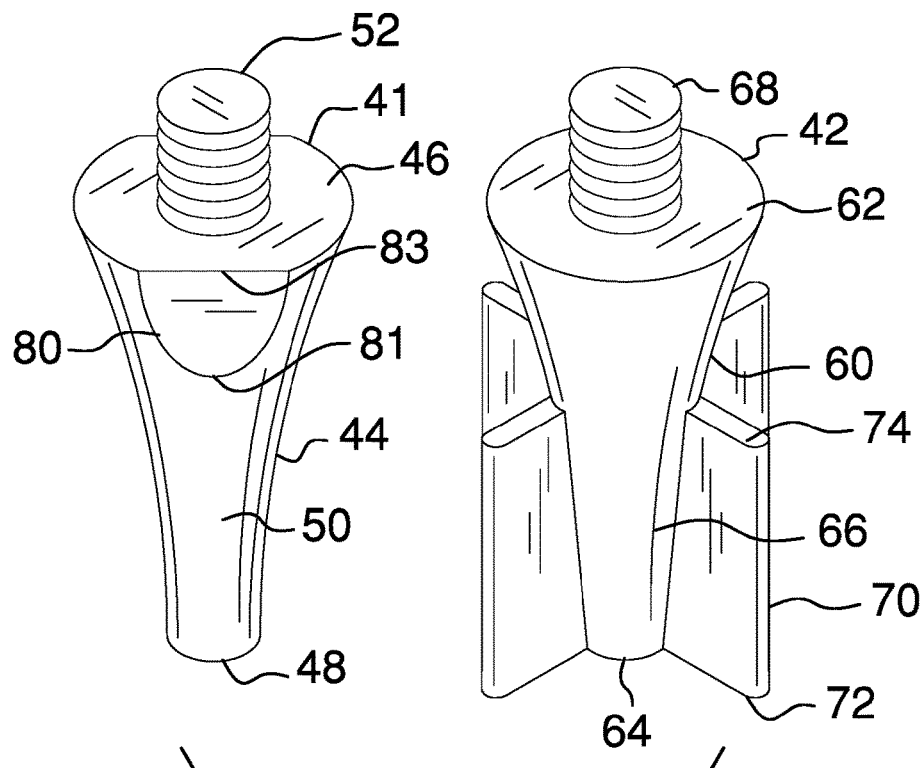
FIG. 1 is a top isometric view of a first spike having a single solid shaft and of a second spike having a central shank and a plurality of spiking tines coaxially extending from the central shank.
Figure 2:
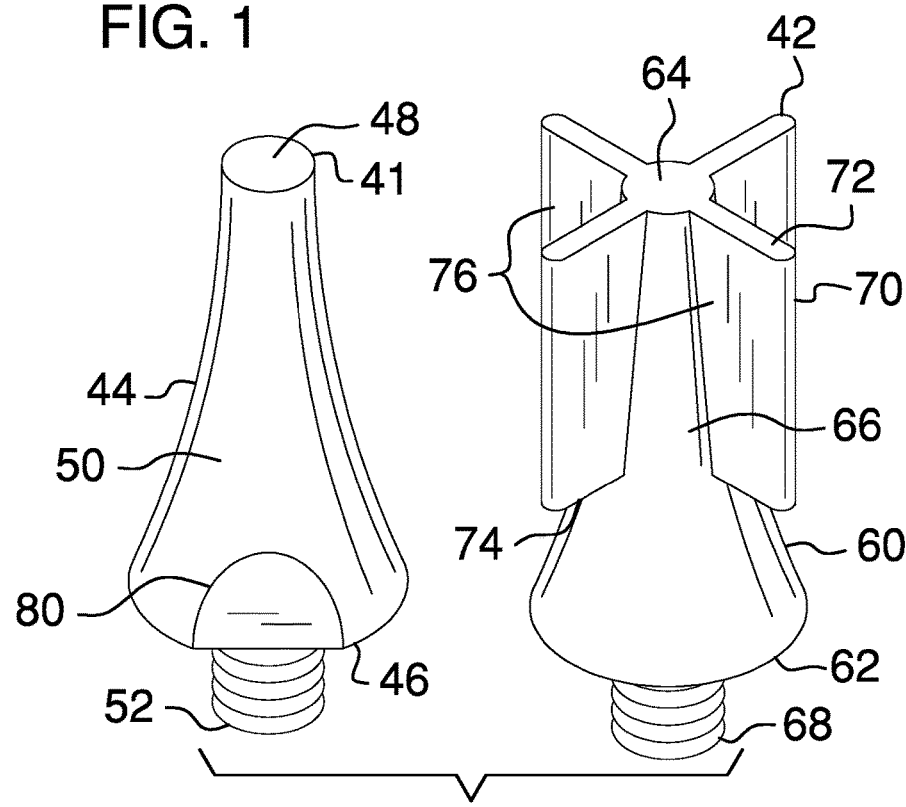
FIG. 2 is a bottom isometric view of each of the first spike and the second spike.
Figure 3:
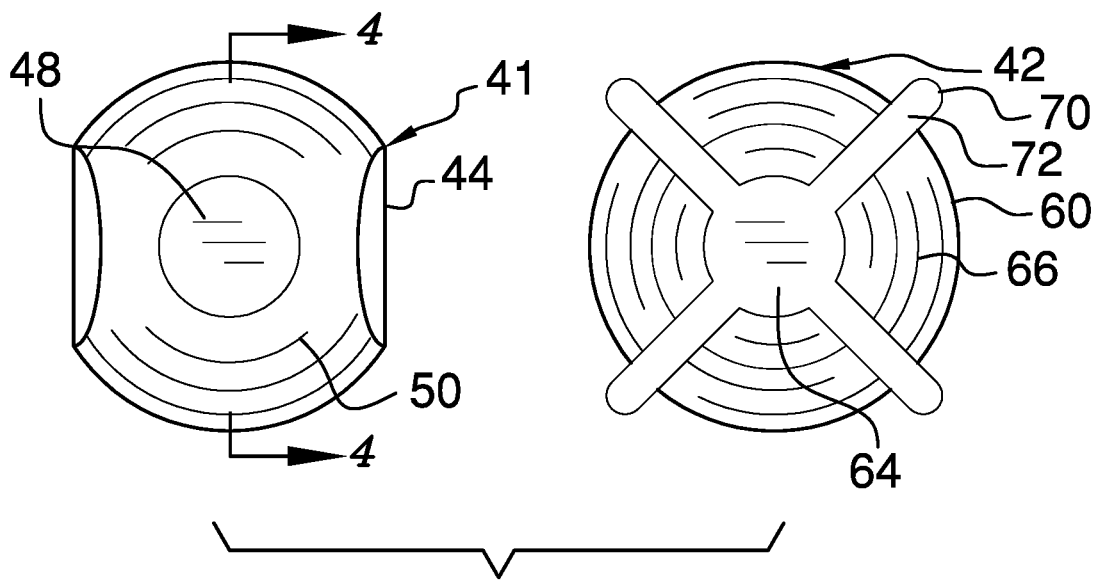
FIG. 3 is a bottom plan view of each of the first spike and the second spike.
Figure 4:
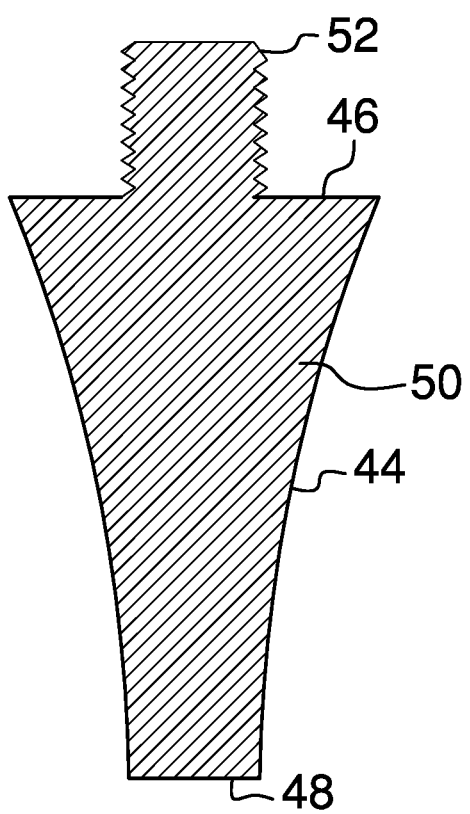
FIG. 4 is a cross-sectional view of the first spike taken along line 4-4 of FIG. 3.
Figure 5:
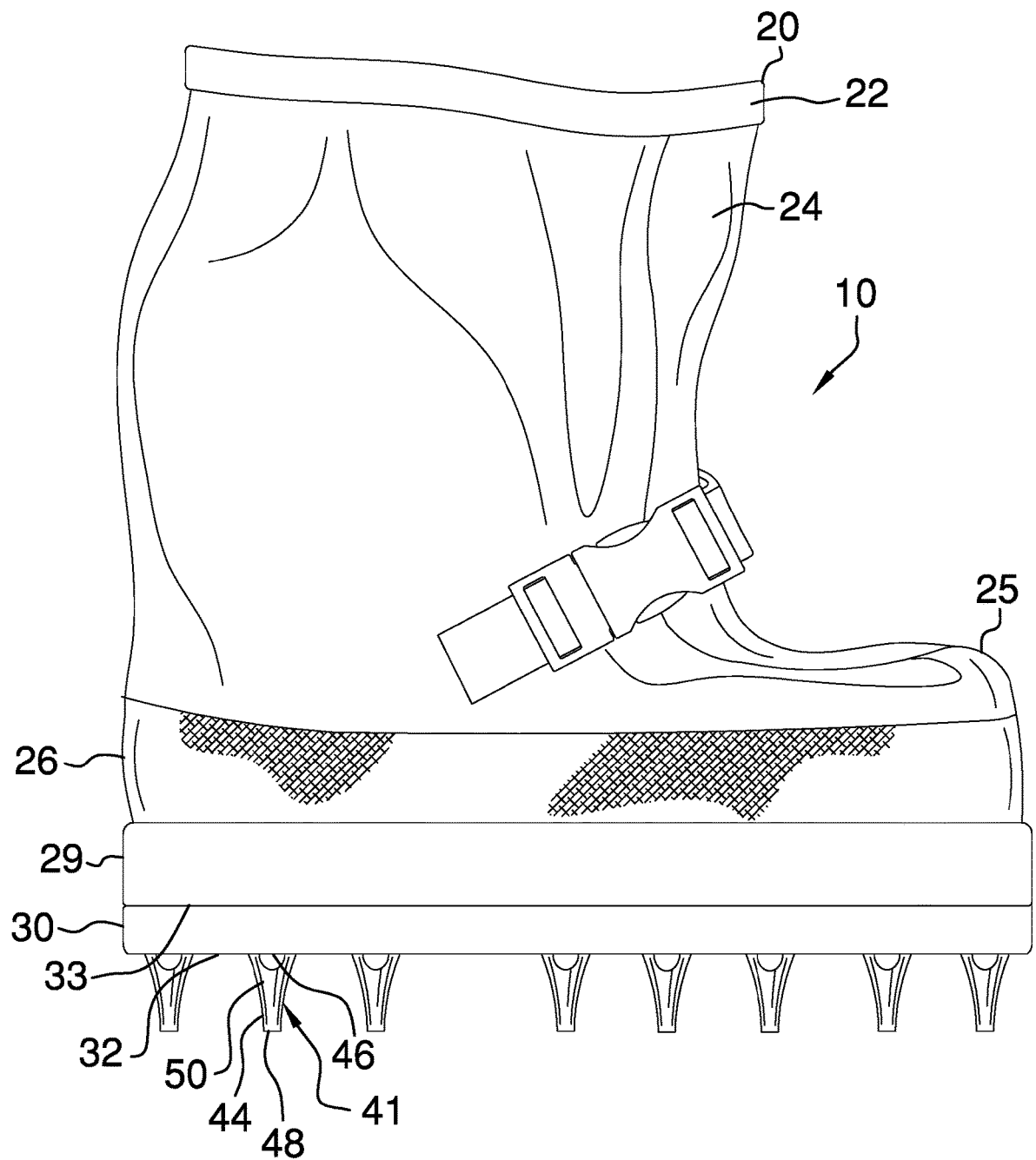
FIG. 5 is a side elevation view of a footwear body with a plurality of the first spikes attached to a sole of the footwear body.
Figure 6:
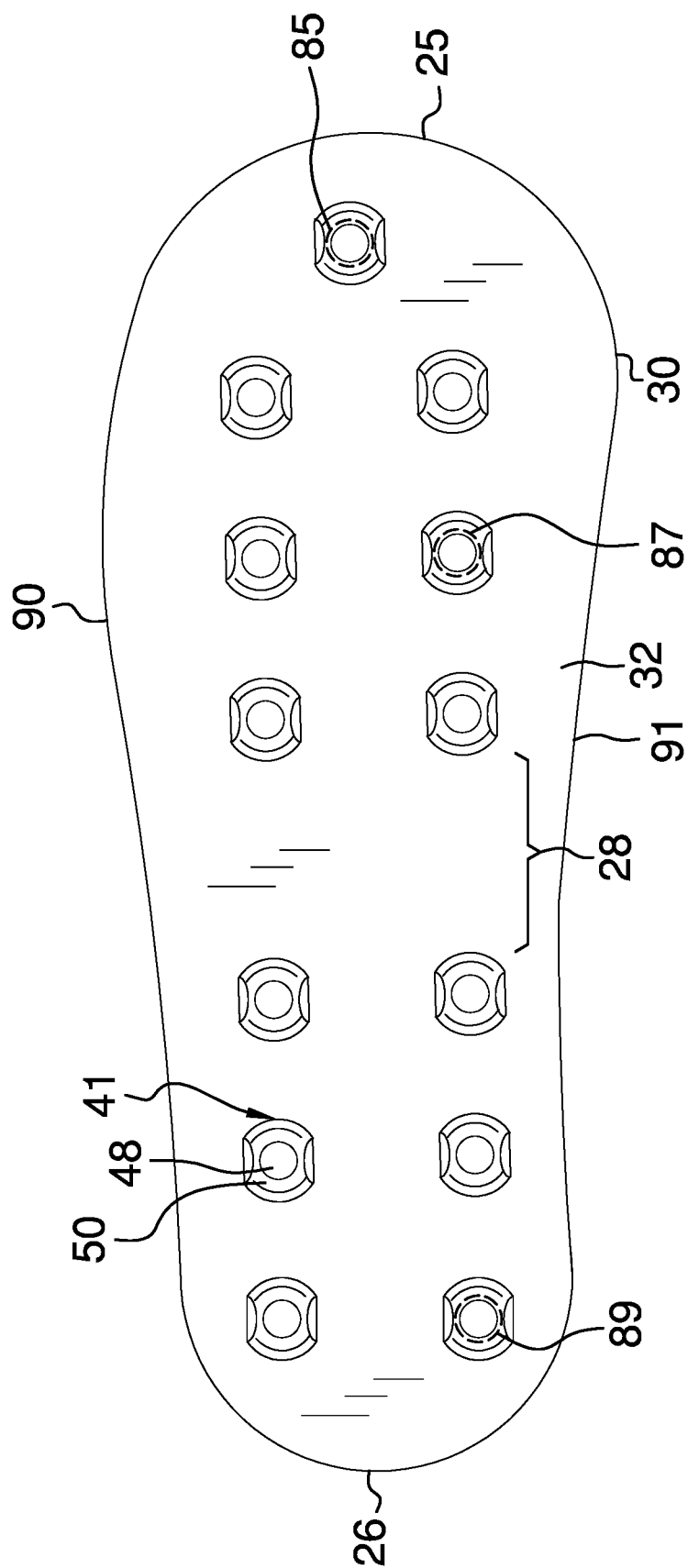
FIG. 6 is bottom plan view of the footwear body with the plurality of first spikes attached to the sole thereof.
Figure 7:
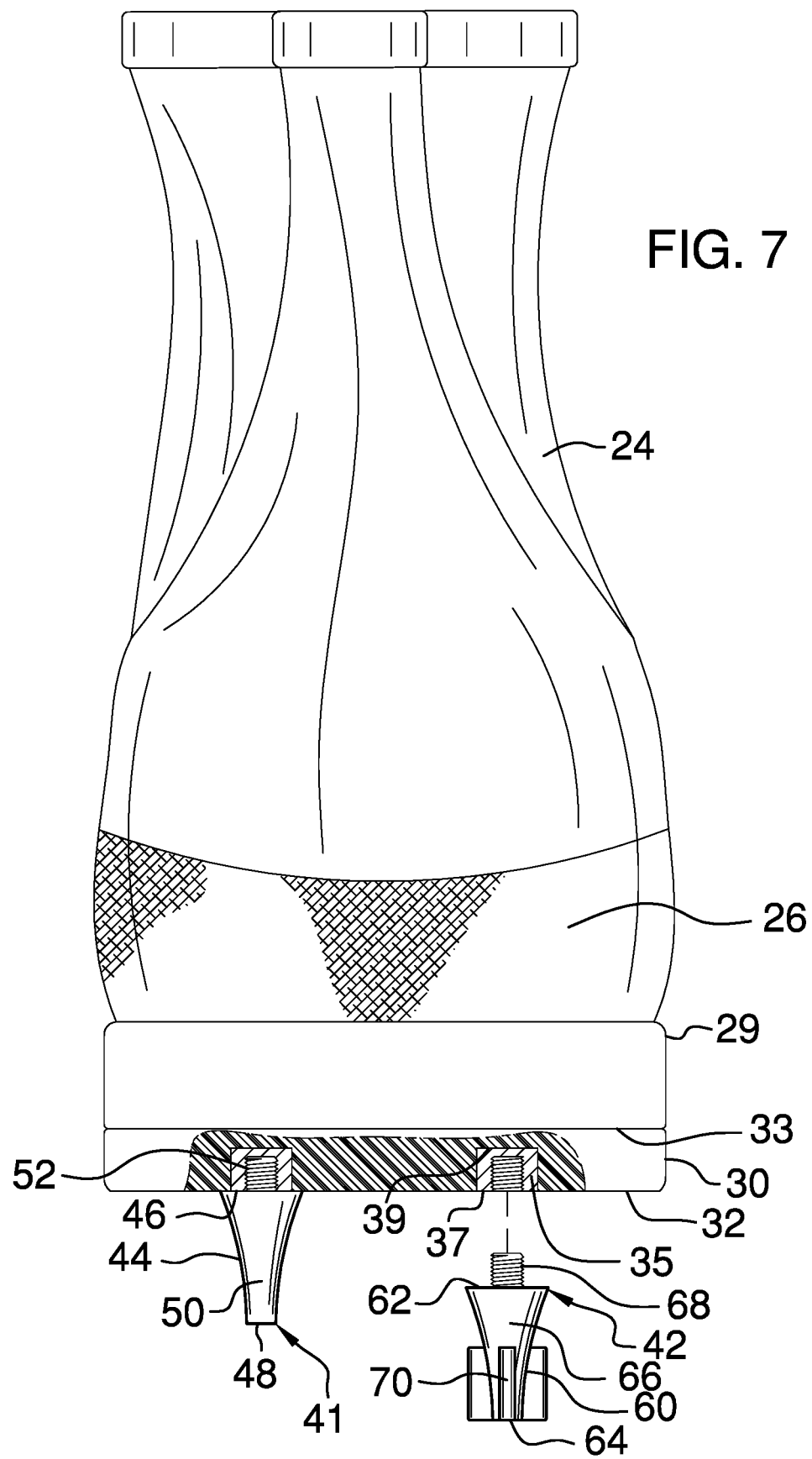
FIG. 7 is a rear elevation view of the footwear body with a partial cutaway view of one of each of the first spike and the second spike.

With reference now to the drawings, and in particular FIGS. 1 through 7 thereof, an example of the instant turf aerator footwear kit employing the principles and concepts of the present turf aerator footwear kit and generally designated by the reference number 10 will be described.

Referring to FIGS. 1 through 7 the present turf aerator footwear kit 10 devised to form holes in the turf to promote a healthy lawn is illustrated. The turf aerator footwear kit 10 includes a footwear body 20, which is preferably a boot 22, having an upper 24, a toe end 25, a heel end 26, an instep portion 28, a sole 29, an outsole 30 disposed on the entire sole 29, an external side 32 of the outsole 30, and internal side 33 of the outsole 30 directly adjacent the sole 29. A plurality of spaced apart threaded receptacles 35 is disposed within the external side 32 of the outsole 30 between the instep portion 28 and each of the toe end 25 and the heel end 26. Each threaded receptacle 35 is perpendicular to the external side 32 of the outsole 30 and further has an open side 37 coplanar with the external side 32 of the outsole 30 and a closed side 39 within the outsole 30. The closed side 39 of each threaded receptacle 35 is disposed approximately midway between the external side 32 of the outsole 30 and the internal side 33 of the outsole 30.

A plurality of at least one of a first spike 41 and a second spike 42 is provided. Each of the plurality of first spikes 41 and the plurality second spikes 42 is engageable to a respective one of the plurality of threaded receptacles 35. The second spike 42 has a total length substantially equal to a total length of the first spike 41. Thus, when both the first spikes 41 and the second spikes 42 are provided in the kit 10, either the plurality of first spikes 41 or the plurality of second spikes 42 can be engaged to the closed receptacles 35 and, alternately, a portion of the first spikes 41 and a portion of the second spikes 42 can be engaged to the closed receptacles 35.

Each first spike 41 includes a single solid substantially frustoconical shaft 44. The shaft 44 has an obround solid flat top end 46, a round solid flat bottom end 48, and a solid concave outer wall 50 continuously disposed between the top end 46 and the bottom end 48. The bottom end 48 is parallel to the top end 46 and has a smaller diameter than a maximum diameter of the top end 46. A centrally disposed first threaded rod 52 extends away from the top end 46.

Each second spike 42 includes a solid substantially frustoconical central shank 60 having a round solid flat upper end 62, a round solid flat lower end 64, and a concave exterior wall 66 continuously disposed between the upper end 62 and the lower end 64. The lower end 64 is parallel to the upper end 62 and has a smaller diameter than a diameter of the upper end 62. A centrally disposed second threaded rod 68 extends away from the upper end 62. A plurality of spiking tines 70 coaxially extend from the central shank 60. Each spiking tine 70 has a bottom edge 72 coplanar with and extending outwardly from the lower end 64 and a top edge 74 parallel to the bottom edge 72. At least two of a pair 76 of the spiking tines 70 are on diametrically opposite sides of the central shank 60. Each of the bottom edge 72 and the top edge 74 can be obround. Each spiking tine 70 has a length of approximately 1 inch from the top edge 74 to the bottom edge 72.

A pair of semicircular indents 80 is disposed in the outer wall 50 of the shaft 44 of the first spike 41 directly adjacent the top end 46. Each indent 80 has an apex 81 and an outer edge 83, which is directly adjacent the top end 46.

The plurality of threaded receptacles 35 includes a forward receptacle 85 centrally disposed proximal the toe end 25, a plurality of rows of pairs of middle receptacles 87 disposed between the forward receptacle 85 and the instep portion 28, and a plurality of rows of pairs of rearward receptacles 89 disposed between the instep portion 28 and the heel end 26. The rows of each pair of the middle receptacles 87 and the rearward receptacles 89 being aligned from a right side 90 to a left side 91 of the outsole 30.

What is claimed is:

1. A turf aerator footwear kit comprising:
    a footwear body having an upper, a toe end, a heel end, an instep portion, a sole, an outsole disposed on the entire sole, an external side of the outsole, and internal side of the outsole directly adjacent the sole;
    a plurality of spaced apart threaded receptacles disposed within the external side of the outsole between the instep portion and each of the toe end and the heel end, each threaded receptacle being perpendicular to the external side of the outsole and further having an open side coplanar with the external side of the outsole and a closed side within the outsole;
    a plurality of at least one of a first spike and a second spike, wherein each of the plurality of first spikes and the plurality second spikes is engageable to a respective one of the plurality of threaded receptacles;
    each first spike comprising:
        single solid substantially frustoconical shaft having an obround solid flat top end, a round solid flat bottom end, and a solid concave outer wall continuously disposed between the top end and the bottom end, the bottom end being parallel to the top end, the bottom end having a smaller diameter than a maximum diameter of the top end;
        a centrally disposed first threaded rod extending away from the top end;
    each second spike comprising:
        a solid substantially frustoconical central shank having a round solid flat upper end, a round solid flat lower end, and a concave exterior wall continuously disposed between the upper end and the lower end, the lower end being parallel to the upper end, the lower end having a smaller diameter than a diameter of the upper end;
        a centrally disposed second threaded rod extending away from the upper end;
        a plurality of spiking tines coaxially extending from the central shank, each spiking tine having a bottom edge coplanar with and extending outwardly from the lower end and a top edge parallel to the bottom edge;
        at least two of a pair of the spiking tines being on diametrically opposite sides of the central shank;
    wherein the second spike has a total length substantially equal to a total length of the first spike;
    wherein the footwear body is a boot;
    wherein the closed side of each threaded receptacle is disposed approximately midway between the external side of the outsole and the internal side of the outsole;
    wherein the top edge and the bottom edge of each of the spiking tines is obround.

2. The turf aerator footwear kit of claim 1 further comprising:
    a pair of semicircular indents disposed in the outer wall directly adjacent the top end, each indent having an apex and an outer edge, the outer edge being directly adjacent the top end.

3. The turf aerator footwear kit of claim 1 wherein each spiking tine has a length of approximately 1 inch from the top edge to the bottom edge.

4. The turf aerator footwear kit of claim 1 wherein the plurality of threaded receptacles comprises a forward receptacle centrally disposed proximal the toe end, a plurality of rows of pairs of middle receptacles disposed between the forward receptacle and the instep portion, and a plurality of rows of pairs of rearward receptacles disposed between the instep portion and the heel end, the rows of each pair of the middle receptacles and the rearward receptacles being aligned from a right side to a left side of the outsole.

5. A turf aerator footwear kit comprising:
    a footwear body having an upper, a toe end, a heel end, an instep portion, a sole, an outsole disposed on the entire sole, an external side of the outsole, and internal side of the outsole directly adjacent the sole, wherein the footwear body is a boot;
    a plurality of spaced apart threaded receptacles disposed within the external side of the outsole between the instep portion and each of the toe end and the heel end, each threaded receptacle being perpendicular to the external side of the outsole and further having an open side coplanar with the external side of the outsole and a closed side within the outsole;
    each of a plurality of first spikes and a plurality of second spikes, wherein each of the plurality of first spikes and the plurality second spikes is alternately engageable to a respective one of the plurality of threaded receptacles;
    each first spike comprising: single solid substantially frustoconical shaft having an obround solid flat top end, a round solid flat bottom end, and a solid concave outer wall continuously disposed between the top end and the bottom end, the bottom end being parallel to the top end, the bottom end having a smaller diameter than a maximum diameter of the top end;
    a centrally disposed first threaded rod extending away from the top end each second spike comprising: a solid substantially frustoconical central shank having a round solid flat upper end, a round solid flat lower end, and a concave exterior wall continuously disposed between the upper end and the lower end, the lower end being parallel to the upper end, the lower end having a smaller diameter than a diameter of the upper end;
    a centrally disposed second threaded rod extending away from the upper end;
    a plurality of spiking tines coaxially extending from the central shank, each spiking tine having a bottom edge coplanar with and extending outwardly from the lower end and a top edge parallel to the bottom edge;
    at least two of a pair of the spiking tines being on diametrically opposite sides of the central shank;
    wherein the second spike has a total length substantially equal to a total length of the first spike;
    wherein the closed side of each threaded receptacle is disposed approximately midway between the external side of the outsole and the internal side of the outsole;
    wherein a pair of semicircular indents disposed in the outer wall directly adjacent the top end, each indent having an apex and an outer edge, the outer edge being directly adjacent the top end;
wherein each of the top edge and the bottom edge of each of the spiking tines is obround.

6. The turf aerator footwear kit of claim 5 wherein each spiking tine has a length of approximately 1 inch from the top edge to the bottom edge.

7. The turf aerator footwear kit of claim 5 wherein the plurality of threaded receptacles comprises a forward receptacle centrally disposed proximal the toe end, a plurality of rows of pairs of middle receptacles disposed between the forward receptacle and the instep portion, and a plurality of rows of pairs of rearward receptacles disposed between the instep portion and the heel end, the rows of each pair of the middle receptacles and the rearward receptacles being aligned from a right side to a left side of the outsole.

\* \* \* \* \*